Nov. 5, 1940.　　　T. E. McFALL　　　2,220,344
PISTON RING
Filed June 26, 1939

Inventor
Thurlow E. McFall
By Liverance and
Van Antwerp
Attorneys

Patented Nov. 5, 1940

2,220,344

UNITED STATES PATENT OFFICE 2,220,344

PISTON RING

Thurlow E. McFall, Sparta, Mich.

Application June 26, 1939, Serial No. 281,061

6 Claims. (Cl. 309—41)

This invention relates to piston rings for use in internal combustion engines, either as compression rings or what is known as oil rings.

A primary object of my invention is to provide a sectional piston bar, using in novel association therewith, ring expanders which are formed of thin strips of spring steel and work, in connection with the ring parts, in such a manner as to be most efficiently adapted to the uses intended. The sections of the ring are substantially independent of each other so that each may have independent inward and outward movements and respond quickly in conforming to the walls of a cylinder in which positioned. Variations in diameter of a cylinder, though small, are nevertheless present and are very well recognized in connection with piston rings, particularly in connection with their effect in the production of "blow-by," that is, a passage of the products of combustion from the combustion chamber of the engine past the piston ring, it being desired that blow-by shall be kept at a minimum. With my invention the variations in the diameter of a cylinder in the length thereof are compensated by the ability of the ring sections to quickly follow and conform to the cylinder walls upon any enlargement thereof, and also to return inwardly upon diminuation of the diameter of the cylinder following an enlargement, without the ring fluttering or tilting or separating very short distances from the inner surfaces of the cylinder.

For the attainment of the objects and purposes stated, as well as many others not at this time particularly enumerated, I have made the invention which is fully described in the following description, taken in connection with the accompanying drawing, in which.

Like reference characters refer to like parts in the different figures of the drawing.

Figures 1, 2:
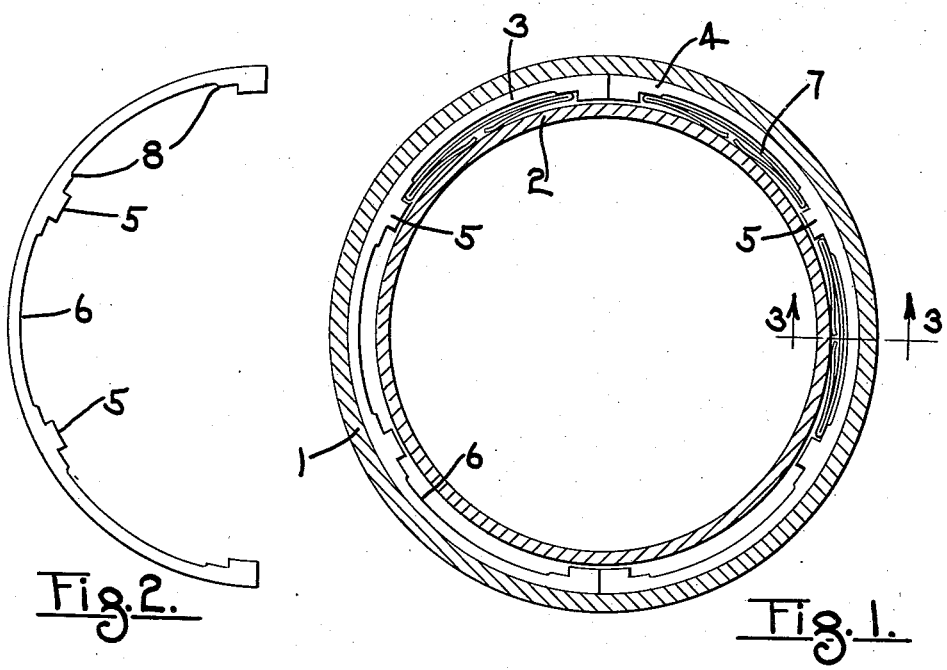
Fig. 1 is a horizontal section through a piston and a cylinder, showing the piston ring of my invention installed with some of the expanders which are used therewith located between the bottom of a piston ring groove and the ring sections.
Fig. 2 is a plan view of one section of the ring, the spring expander members to be used therewith being removed.

It is quite general practice to produce piston rings from individual out-of-round castings. The castings are produced from patterns which initially are of circular outline of the size for the ring to be produced, the pattern being cut through at a side and opened at the parting and a segment inserted at said parting to produce an out-of-round pattern from which ring castings are made. In machining the piston ring casting a piece is cut out of the ring casting corresponding to and at the place of the insertion of the segment in the pattern. After the segment has been removed there is left a gap or parting in the piston ring, the width of which is equal to the length of the segment cut out. By compressing the ring to close the gap, a substantially circular ring of the desired size is produced and which when closed and within a cylinder has an inherent tension because of such closure of the parting, which causes the ring to press outwardly against the inner walls of the cylinder.

Rings as thus made have been very satisfactory and are still satisfactory within certain speeds of travel of the piston. Modern engines in automobiles have been greatly speeded up so that the pistons move much more rapidly in their reciprocations in the cylinders. Also the present trend in engines is to increase the compression of the fuel charge in the combustion chambers at the upper ends of the cylinders, both factors resulting in heavier duty which the piston rings must sustain. In an attempt to provide piston rings capable of serving the heavier duty the gap in the piston ring has been lengthened so that when the piston ring is contracted or compressed to circular form, as when working in an engine cylinder, there is produced a resultant higher tension in the ring.

The desired result with respect to piston rings and cylinders, is that the pressure of the rings against the inner walls of the cylinders shall be uniform entirely around the rings. This is a result which cannot be obtained with rings of the type which have been described. At the gap or parting or adjacent each side of the gap or parting in the ring, the pressure against a cylinder wall is much less than it is opposite the parting. Between the gap and half way around the ring there are zones of widely varying pressures. The necessity of increasing the length of the segment which is removed in the piston ring casting in order to obtain the necessary tension at each side of the gap or parting or at other points around the ring, has produced excessive pressures in some parts of the rings, which, however, have to be taken with whatever detrimental results may come therefrom.

The high speed of piston travel and the high compression of the fuel charges in internal combustion engines, coupled with the irregular and non-uniform pressures of the piston rings at different parts of their lengths against the cylinder walls, tends to cause undesirable fluttering, with a consequent blow-by of gases between the outer bearing surfaces of the piston rings and the cylinder walls, particularly at the higher engine speeds. The pistons of internal combustion engines are, substantially all of them, water-cooled throughout their lengths, but there are large variations in temperatures in the length of a cylinder which result in variations in expansion of the cylinder and perhaps irregularities in the surface of the cylinder walls. At the upper end of a cylinder adjacent the combustion chamber where the fuel is fired, temperature conditions are very high compared with those at the lower end of the same cylinder; and in between the ends of the cylinder there are a wide variety of temperatures resulting in different diameters of a cylinder which, when at ordinary atmospheric temperature at which it is machined and finished, might be of a substantially uniform diameter.

The piston ring in order to serve its function properly, must conform at all times to the inner wall of the cylinder at all speeds of movement of the pistons. The contraction and expansion of the ordinary piston rings is not rapid enough to cause the outer bearing surface of the rings to hug the cylinder walls all of the time, and as the speed of reciprocation of the pistons increases, this undesirable effect increases, with an increasing amount of blow-by, fluttering of the rings, scuffing of their outer surfaces, and inability to properly take care of the conditions met.

With my invention a novel piston ring is produced in which there is attained a substantially uniform outward pressure of the piston ring entirely around it against the walls of the cylinder, and the very high tensions now considered necessary in single piece piston rings are eliminated. Where a pressure of eight pounds of the piston ring against the walls of the cylinder opposite the gap is common, with a resultant cutting through of the oil film and scoring or scuffing of both the cylinder walls and the piston rings, a uniform pressure of the piston ring against the cylinder walls of approximately two pounds is amply sufficient in the novel ring of my invention. With such uniform low pressure blow-by and ring and cylinder scuffing and scoring are eliminated.

The cylinder 1 of conventional structure, has a piston 2 reciprocable therein, in which piston the usual ring grooves are made. In the disclosure the piston ring consists of two segments 3 and 4, each semi-circular in form and having an outer bearing surface which is an arc of a circle of 180° in length. It is to be understood that while the ring is shown in two sections, a larger number of sections may be used without departing in any way from my invention.

At the inner curved side of the ring there are a plurality of spaced projections 5, one at each end of a ring section and others between, which preferably though not necessarily will be equally spaced from each other. Between the projections are a plurality of elongated recesses or pockets 6, in each or in certain of which expanders 7 are adapted to be positioned. It will be understood that an expander may be placed in each of the elongated pockets 6, but if conditions warrant, the expanders may be placed in only part of said pockets. Preferably the intermediate portion of the pockets 6 will be deepened so as to provide shoulders 8 which are spaced a short distance away from the shoulders provided by each side of the projections 5. The expander 7 extends across the deepened portion between the shoulders 8 and rests at its ends on the sections between said shoulders and the adjacent sides of the projections 5, as shown in Fig. 1.

Figures 3, 5:
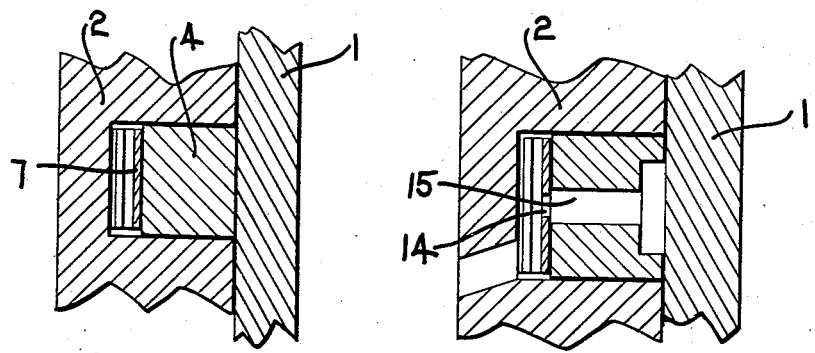
Fig. 3 is an enlarged vertical section substantially upon the plane of line 3—3 of Fig. 1.
Fig. 5 is a vertical section similar to Fig. 4 but showing an oil ring and expander modified for use therewith.
Figure 4:
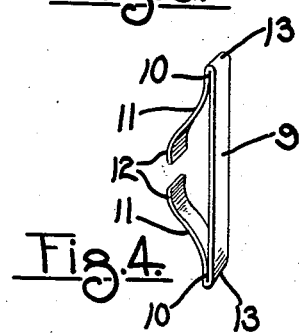
Fig. 4 is a perspective view of one of the spring expanders, a plurality of which may be used in conjunction and association with the piston ring sections.
Figure 6:
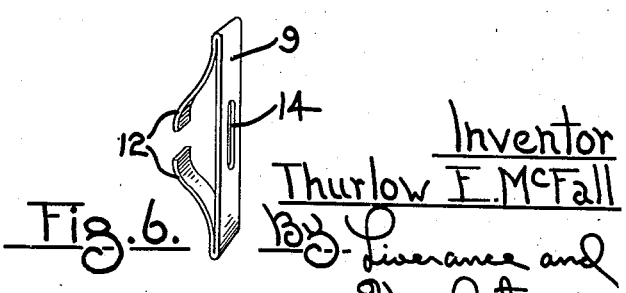
Fig. 6 is a perspective view similar to Fig. 4, showing the expander provided with an oil passing slot in the base portion thereof.

The preferred form of the expander is shown in Figs. 4 and 6, there being no difference between the two except that in the base portion 9 of that shown in Fig. 6, a slot is provided when the expanders are to be used with oil rings as in Fig. 5. The expander consists of a base portion 9 having at each end a section bent back upon the base closely thereagainst for a short distance, as indicated at 10, and is then continued in an outward curve 11, terminating in a reverse bend or curve 12, one adjacent each end of the piece of spring metal from which the expander is made, as shown in Figs. 4 and 6. The connection between the base at 9 and the free end portions of the expander is indicated by the close or sharp bend at 13.

In installing one of the expanders in a pocket 6, pressure is applied to the parts 12 with one end at 13 of the expander engaged against a side or shoulder of the projection 5, and the other end riding upon the projection 5 adjacent, thereby flexing or curving the base sufficiently that both ends of the expander are received within the pocket and when freed of pressure will tend to engage against the shoulders of the projections 5 between which the expander is located. In various other piston ring expanders of the prior art with which I am familiar, the curvature of the bent end portions has been such that as more pressure is brought to bear thereagainst, due to end contact with the bottom of the ring groove, a greater amount of the expander comes into contact with the bottom of the ring groove. Many times such additional surface contact and additional pressure following therefrom is sufficient to break one or both of the end portions of the expander. It will be apparent that in the construction as shown in Figs. 4 and 6, irrespective of how much pressure the end portions 12 sustain, or how closely they approach the base portion 9, they are curved so that no additional surface contact will be had between them and the bottom of the ring groove. When the sections of the ring are located in a ring groove of a piston and the piston installed in a cylinder, the pressure of the expanders is exerted outwardly to force the ring section against the inner walls of the cylinder. It is also apparent that with my invention, expanders having different degrees of strength may be used, for example lighter expanders at intermediate pockets, while those at the end will have expanders of greater strength, and the pressure of the sectional ring against the cylinder walls may be made to be substantially uniform throughout the peripheral length of the ring.

In Fig. 3 the ring structure is shown as filling a piston ring groove which in ordinary practice would be filled with the ordinary and well-known compression ring. In Fig. 5 the expander is modified as shown in Fig. 6, having the longitudinal oil passing slot 14 at the intermediate portion of the base 9, and the piston ring is provided with oil passing slots 15 which will be made in the sections of the ring from the outside through to the bottom of the several pockets or recesses 6.

With piston rings of the sectional form as of those described, each ring may be made from a single cylindrical casting, with the projections at the inner sides cast therewith, and be machined at its outer curved surfaces and at its opposed flat sides to the desired dimensions, and cut through at two points to produce the ring shown in Fig. 1; or where the ring is to consist of more than two sections, it will be cut through at a corresponding number of places. The cutter so used being very thin, will cut away only the necessary gap or clearance between the adjacent ends of the ring sections. Thereafter, by assembling the expanders in the pockets at the inner side of the ring sections, the rings are complete and ready for installation.

The substantial uniformity of outward pressure and the low pressure which can be used in rings of this character make a ring having very desirable characteristics. Ring fluttering is eliminated. The ring is quick in action and not sluggish in movement, so that it conforms to the surface of the inner walls of the cylinder as the diameter of the cylinder may vary in the length thereof traversed by a ring. The spring pressure is relatively light. Blow-by is substantially eliminated, irrespective of high speed of piston reciprocation.

The invention while specifically described, is not to be limited in any respect other than as required by the terms of the claims appended hereto which define the invention.

I claim:

1. A piston ring comprising, a plurality of arcuate ring sections located end to end to make a circular ring, said sections having radial inwardly extending spaced apart projections at their inner sides, and expanders positioned in the spaces between said projections, said expanders each comprising a length of thin spring steel, having a base portion and at each end having an end portion integral with the base bent back upon the base and then curved outwardly and terminating in a reversely curved portion, said terminal reversely curved portions being spaced from the base portion, and at their ends being spaced a short distance from each other.

2. In combination with a piston ring of the class described, an expander comprising a length of spring steel formed into a straight base portion and having end portions bent back upon the base portion at the same side thereof for a short distance, then curved outwardly away from the base and terminating in a reversely curved section, and means for connecting said expander to the piston ring.

3. In combination with a piston ring comprising, a plurality of arcuate ring sections located end to end to make a circular ring, of a plurality of piston ring expanders disposed at the inner curved sides of said ring sections, each ring expander comprising a base of flat spring metal with end sections integral with the base and turned back thereupon for a short distance at the same side of the base, and thence curved outwardly for a distance and ending in terminal portions which are substantially parallel with and spaced from said base portion, and means at the inner sides of the ring sections for releasably engaging said expanders at their ends for holding them in operative relation to the ring sections with which associated.

4. A piston ring expander comprising, a length of spring steel forming a flat base portion with integral end portions bent back closely upon said base for a short distance and then curved away from said base substantially in the form of an S, said end portions being located at the same side of the base and extending toward and approaching each other.

5. A piston ring comprising, a plurality of arcuate ring sections located end to end to make a circular ring, said sections having radial inwardly extending spaced apart projections at the inner sides, the sides of said projections being substantially parallel to each other and providing shoulders, and expanders positioned in the spaces between said projections, said expanders each comprising a length of thin spring material formed into a straight base portion with end sections, one at each end of the base portion integral therewith, bent back upon the base for a short distance and then curved outwardly, and terminating in reversely bent portions which are spaced from the base portion and at their ends spaced a short distance from each other.

6. A piston ring comprising the elements in combination defined in claim 5, said ring sections between the inwardly extending projections being recessed at their inner sides with a shallow recess, the length of which is less than the length of a base portion of an expander which is located in the space between two consecutive projections.

THURLOW E. McFALL.